United States Patent [19]

Nakajima

[11] 3,982,792
[45] Sept. 28, 1976

[54] EMERGENCY BRAKE SYSTEM FOR A VEHICLE
[75] Inventor: Norio Nakajima, Sagamihara, Japan
[73] Assignee: Caterpillar Mitsubishi Ltd., Tokyo, Japan
[22] Filed: Nov. 17, 1975
[21] Appl. No.: 632,329

[30] Foreign Application Priority Data
Nov. 29, 1974 Japan............................ 49-136219

[52] U.S. Cl............................ 303/6 A; 188/151 A; 303/6 M; 303/9; 303/13; 303/71; 303/84 A
[51] Int. Cl.² .................. B60T 13/22; B60T 17/18
[58] Field of Search .................. 303/6, 7, 9, 13, 15, 303/68, 71, 84, 50; 188/151 A, 170; 200/82 D, 82 R, 83 A

[56] References Cited
UNITED STATES PATENTS

| | | | |
|---|---|---|---|
| 3,504,946 | 4/1970 | Valentine et al................ | 303/6 R X |
| 3,507,541 | 4/1970 | Ayers, Jr.......................... | 303/13 X |
| 3,582,150 | 6/1971 | Williams et al.................. | 303/13 X |
| 3,905,651 | 9/1975 | Hornung.......................... | 303/13 X |

Primary Examiner—Trygve M. Blix
Assistant Examiner—Douglas C. Butler
Attorney, Agent, or Firm—Oscar G. Pence

[57] ABSTRACT

An emergency brake system is provided for a vehicle having separate fluid operated front and rear wheel service brakes and a control system with separate front and rear fluid conduits for individually conducting pressurized fluid to effect the application of the service brakes. The emergency brake system includes an emergency brake and a pressure differential detecting device connected to each of the fluid conduits for detecting a difference in the fluid pressures of the conduits. The detecting device is connected through apparatus to the emergency brake to effect the automatic application of the emergency brake when the service brakes are applied and the difference in the pressures of the conduits is beyond a predetermined value.

6 Claims, 4 Drawing Figures

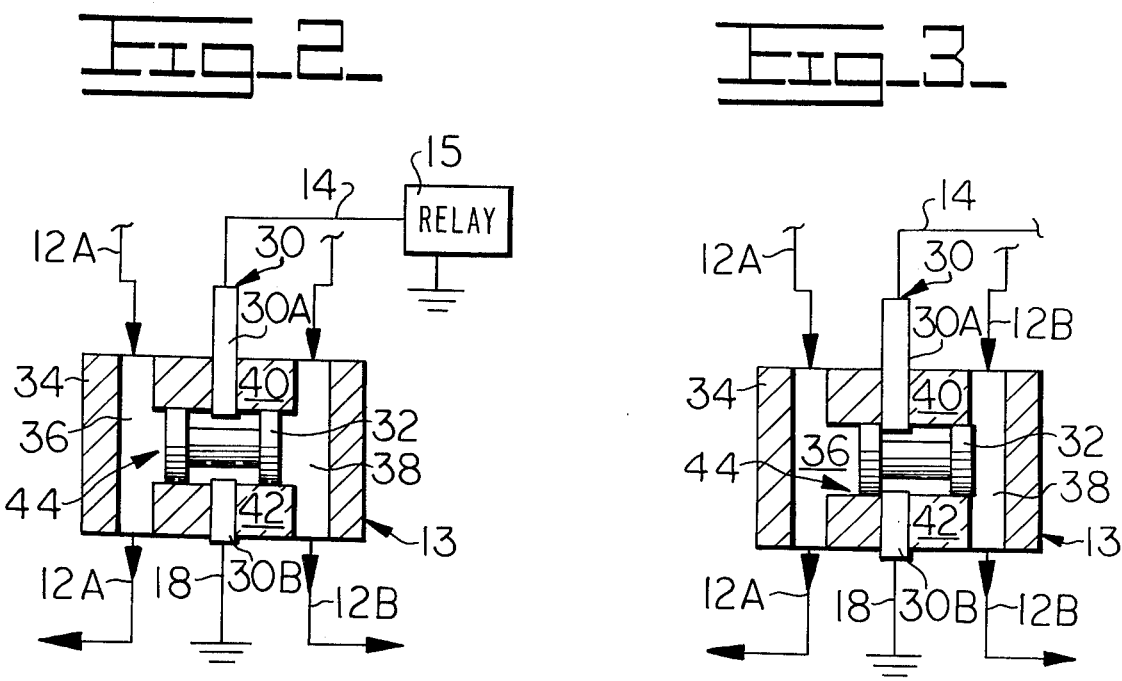
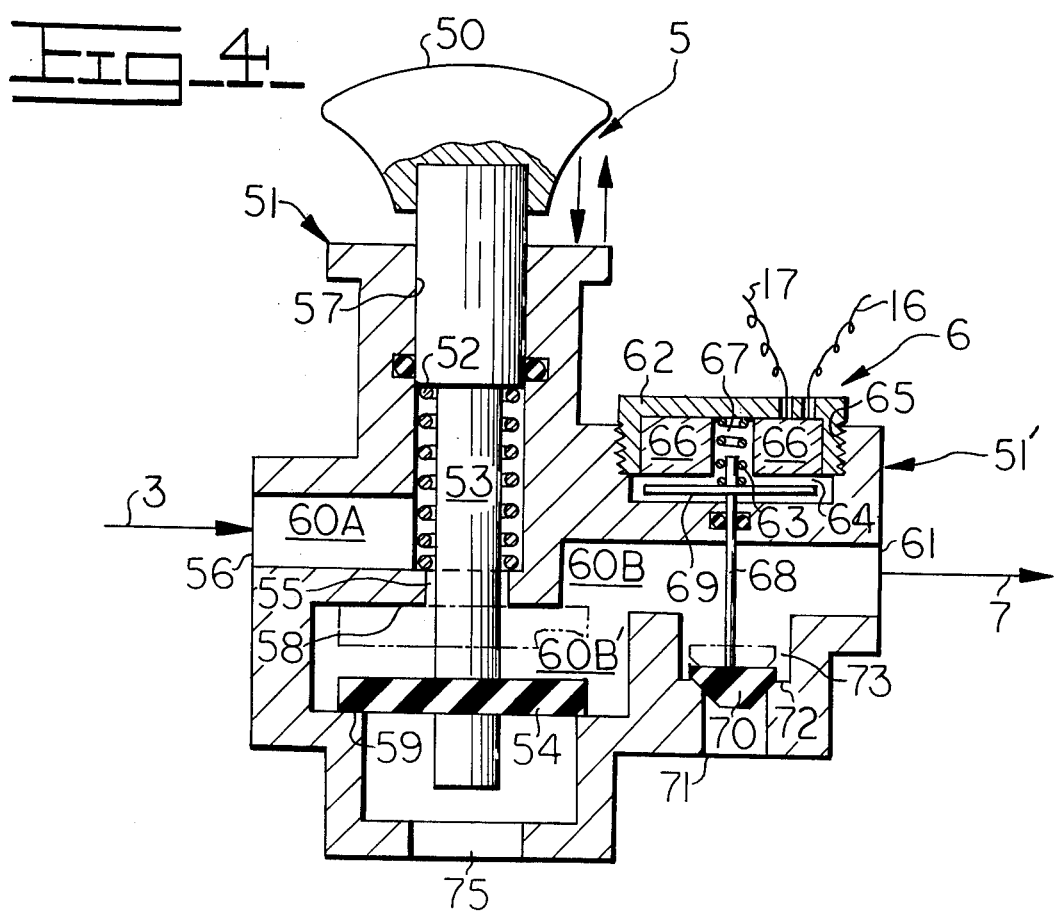

EMERGENCY BRAKE SYSTEM FOR A VEHICLE

BACKGROUND OF THE INVENTION

This invention relates to brake systems for vehicles and the like and pertains more particularly to an improved emergency brake system for use in association with dual fluid operated service brakes to effect the automatic application of the emergency brake upon the application of the service brakes when a hydraulic failure occurs in one of such service brakes.

Many heavy duty vehicles, such as wheel loaders and the like, have a hydraulic service brake for each of its wheels and a separate drive line mounted emergency brake. In vehicles of this type, it is common practice to use an air-over-hydraulic service brake system which has a pair of air actuated master cylinders for applying separate ones of the wheel brakes, such as one master cylinder for the front wheel brakes and the other for the rear brakes. Also, the emergency brake is usually constructed so as to be spring applied and air pressure released so as to be automatically applied whenever air pressure is lost or becomes insufficient to apply the service brakes. The service brake system is normally controlled by an operator by a treadle or foot pedal operated valve located in the operator station, whereas the emergency brake is normally controlled manually by a lever or button operated emergency valve.

The main problem with such prior art brake systems is that there is no connection between the hydraulic portion of the service brake system and the emergency brake to effect the application of the emergency brake when an abnormal condition in such hydraulic portion occurs. Consequently, the operator would not be aware of a hydraulic failure in the service brake system until he had attempted to apply the service brakes and found them ineffective. In order to correct such a situation, he must then reach for and apply the emergency brake control, which is quite time consuming. Thus, it would be desirable to provide an emergency brake system which would automatically apply the emergency brake in the event of a hydraulic failure in the service brake system so as to eliminate the delay between the discovery of such failure and the manual application of the emergency brake by the operator.

SUMMARY AND OBJECTS OF THE INVENTION

Accordingly, it is an object of this invention to provide an improved emergency brake system which overcomes the above problems of the prior art brake systems.

Another object of this invention is to provide a emergency brake system which is capable of detecting a failure in one of the hydraulic portions of a dual hydraulic service brake system and is effective in automatically applying an emergency brake of the vehicle when the operator attempts to apply the service brakes.

Another object of this invention is to provide an improved emergency brake system which, while accomplishing the above, does not effect the normal operation or functions of either the service brake system or the emergency brake, and which is simple and economical in construction.

Other objects and advantages of the present invention will become more readily apparent upon reference to the accompanying drawings and following description.

BRIEF DESCRIPTION OF THE DRAWINGS

FIG. 2 is an enlarged cross sectional view of a pressure differential detecting device employed in the system of FIG. 1 and showing a switch thereof in an open position.

FIG. 3 is a cross sectional view similar to FIG. 2, but with the switch in a closed position.

FIG 4 is an enlarged cross sectional view of an integral body for housing a manual emergency valve and a solenoid operated air bleed valve of the present system.

DETAILED DESCRIPTION OF THE PREFERRED EMBODIMENT

Figure 1:
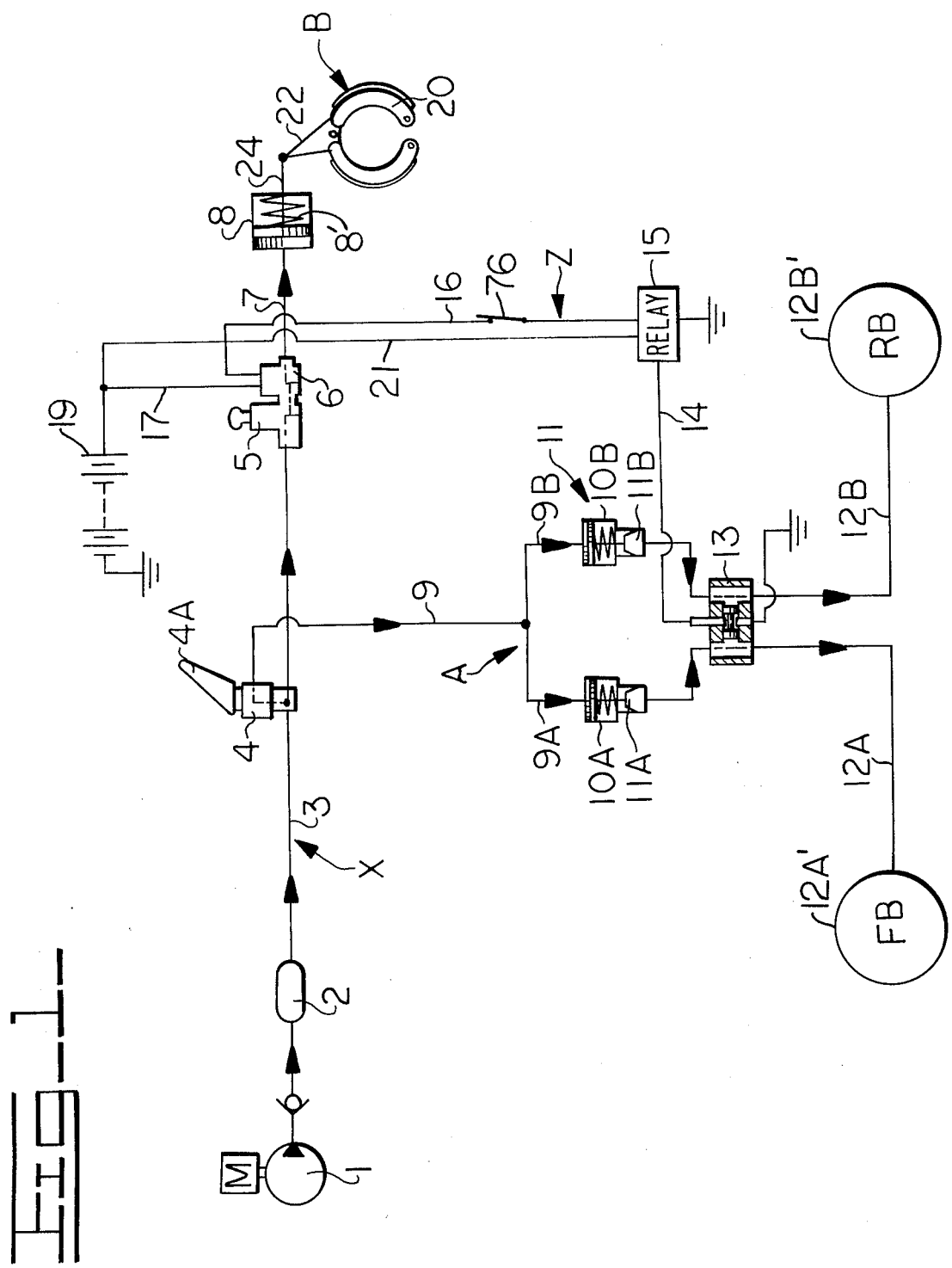
FIG. 1 is a schematic circuit diagram illustrating an improved emergency brake system embodying the principles of the present invention for use in association with an air-over-hydraulic service brake system and a mechanically applied, air released emergency brake of a vehicle.

Referring more particularly to the drawings, an improved emergency brake system embodying the principles of the present invention is generally illustrated at B in FIG. 1 in association with a typical air-over-hydraulic service brake system, schematically shown at A, for a vehicle, such as a wheel driven loader, not shown.

The service brake system is controlled by air pressure from a source of pressurized air X including a motor driven air compressor 1 and an air reservoir 2. A check valve is preferably disposed between the compressor and the air reservoir so as to admit air to the reservoir, but prevent flow in the opposite direction. The pressurized air is connected by a first air line 3 to a control valve 4, which valve is operated by a foot pedal 4A. A second air line 9 having branch lines 9A and 9B communicate air from the control valve 4 to brake actuating means 11, such as a pair of air actuating motors or chambers 10A and 10B. The chambers individually actuate dual master cylinders 11A and 11B, respectively. A pair of hydraulic conduits 12A and 12B are connected to their respective master cylinders 11A and 11B for communicating hydraulic pressure to individual brakes, such as the front and rear wheel brakes 12A' and 12B' of the vehicle.

The emergency brake system B includes a manual emergency valve 5, which is in continuous communication with air pressure in the first air line 3 through the control valve 4, and an internal, expanding shoe-type emergency brake 20 which is normally applied to the drive line, not shown, of the vehicle. As the brake 20 preferably serves as a parking brake, as well as an emergency brake, it will be understood that while the term "emergency" is used herein by itself for simplicity, it is intended to mean "emergency and parking." The brake 20 is controlled by an air releasing motor or air chamber 8 through a rod 24 and a link 22. Pressurized air communicated to the air chamber 8 through a conduit or air line 7 is operative to compress a spring 8' and extend the rod 24 to the right and thereby effect the release of the brake 20. Upon loss of pressurized air from the air chamber 8, the spring 8' will overcome the piston of the air chamber, forcing it to the left, thereby applying the emergency brake 20 so as to lock the drive line of the vehicle.

The emergency brake system also includes means for automatically actuating the emergency brake 20 when a failure occurs in the hydraulic portion of the service brake system A, to which the present invention more closely appertains. Such means generally includes a solenoid operated valve 6, a pressure differential detecting device 13 and an electric circuit Z for selectively energizing the solenoid operated valve in a manner hereinafter more fully described.

As best shown in FIGS. 2 and 3, the pressure differential detecting device 13 includes a body 34 having a pair of internal flow paths 36 and 38 which are connected in communication with the conduits 12A and 12B, respectively. The body also includes a short transverse bore 44 extending between the flow paths 36 and 38. The detecting device 13 also includes an electrical switch 30 which includes a pair of fixed electrical contacts 30A and 30B which are provided in an upper region 40 and a lower region 42, respectively, of the transverse bore 44. The switch 30 also includes a movable electrical contact 32 which is reciprocably mounted within the transverse bore 44. The moveable contact is resiliently biased to a center position in which it is shown in FIG. 2 in any suitable known manner, such as by a pair of centering springs, not shown. Such springs may be positioned between a respective one of the ends of the moveable contact and an adjacent wall of the body 34. The moveable contact also has a reduced sized center portion to provide a pair of spaced contact shoulders for engagement with protruding ends of the fixed contacts 30A and 30B when the contact 32 is moved to the right or the left, as shown in FIG. 3.

Referring now to FIG. 4, there is shown an integral body 51 for housing the solenoid operated air bleed valve 6 and the manual emergency valve 5 in an integral manner. For sake of simplicity, the aforesaid control valve 5 and air bleed valve 6 will be hereinafter described separately in association with their integral body 51. The body 51 includes an inlet port 56 to which the first air line 3 is connected, and an outlet port 61 connected to the air line 7. The body also includes first and second air bleed ports 75 and 71, respectively.

A stepped bore 57 is provided within the valve body 51 for reciprocably mounting a valve stem 53 of a valve member 54 for the emergency valve 5. The valve stem is actuated by a hand knob 50 at one end thereof. The stem is biased towards an upward brake actuating position by a spring 52 disposed about a reduced diameter center portion of the stem and extendable between a shoulder defined on the stem by the reduced diameter portion and a flange 58 defined by the stepped bore 57. The stem extends through an opening 55 in the flange 58 into a cavity or leading flow path 60B'. A shoulder portion 59 is provided in spaced relation from the flange 58. The valve 54 is secured adjacent the lower end of the valve stem 53 for movement between the flange 58 and the shoulder portion 59. A first internal passage 60A communicating with the inlet port 56 intersects with the stepped bore 57. When the valve 54 is in its lower position in which it abuts the shoulder portion 59, air pressure may be communicated through the intermediate path 55 into the leading path 60B' which communicates the pressurized air with a second internal path 60B communicating with the outlet port 61.

The second flow path 60B extends through a region 51' of the body which houses the solenoid operated valve 6. Such valve includes an elongated valve stem 68 reciprocably mounted in the body region 51'. The valve stem 68 has a magnetically attractable head or steel disc 69 mounted at the upper end thereof and a valve member 70 mounted at its lower end. The head 69 of the valve stem 68 is disposed within a cavity 65 which houses the valve solenoid. The solenoid includes a cupped-shaped housing 62 screw threadably mounted within the cavity 65 and an electromagnetic iron core 66 secured within the housing 62. The iron core is provided with a cylindrical cavity portion 67 concentric with the stem 68 for mounting a return spring 63 for biasing the stem downward so as to provide a gap 64 between the head 69 and the core 66. The gap 64 is of a size which permits the attraction of the head 69 towards the iron core 66 when such core is energized in a manner hereinafter described. The valve 70 on the lower end of the stem 68 is disposed within a cavity 73 communicating with the second flow path 60B. When the solenoid is not energized, the spring 63 urges the valve downwardly into seating engagement against a shoulder 72 to prevent the escape of air through the second air bleed port 71. Similarly, the spring 52 of the emergency valve 5 is effective in urging its valve 54 downwardly against the shoulder portion 59 to prevent the escape of air from the first air bleed port 75.

The electric circuit Z, as best shown in FIG. 1, includes a source of electrical energy, or battery 19, which is connected by a lead 17 to the electromagnetic core 66 of the solenoid operated valve 6. Preferably, the core 66 is energized by the use of a relay 15 which is connected to the core by a lead 16. Such lead 16 includes a manual switch 76. The relay 15 is also connected to the battery by a lead 21 and to one of the fixed contacts 30A of the switch 30 by a lead 14. The other fixed contact 30B, in turn, is connected to ground by a lead 18 so that when the switch 30 is closed, the relay is energized to complete the circuit of the solenoid operated valve 6.

OPERATION

While the operation of the present invention is believed to be clearly apparent from the foregoing description, further amplification will subsequently be made in the following brief summary of such operation. With the components functioning properly, pressurized air will be supplied to the control valve 4 from the compressor 1 or air reservoir 2 through the first air line 3, and then through the control valve to the manual emergency valve 5. When the operator desires to move the vehicle, he will push downwardly on the knob 50 of the emergency valve which will seat the valve 54 against the shoulder 59. When air pressure sufficient to actuate the service brakes is present, such air pressure is effective in holding the valve 54 seated against the force of the return spring 52. In normal operation, it will be understood that the electric circuit 2 for the solenoid valve 6 will be open so that the valve 70 will be seated against the shoulder portion 72. As a result, air pressure will then be transmitted through the integral body 51 of the emergency valve 5 and solenoid valve 6 through the air line 7 into the air chamber 8. Thus, the air pressure in chamber 8 is effective in compressing the spring 8' so as to release the emergency brake 20.

When the operator depresses the foot brake 4A, the control valve 4 will communicate air through the second air line 9 and branch lines 9A and 9B into each of the air chambers 10A and 10B of the service brake system B, thereby actuating the master cylinders 11A and 11B, respectively. As a result, pressurized oil is fed therefrom through the hydraulic conduits 12A and 12B into their respective wheel brakes 12A' and 12B'. Under normal operating conditions, it will be understood that the pressure of the oil passing through the hydraulic pressure detecting device 13 will be substantially equalized so that the switch 30 thereof is kept open.

Whenever air pressure is lost or becomes insufficient to apply the service brake, the spring 52 of the emergency valve 5 is designed to shift the stem 53 upwardly, thus bringing the valve 54 into engagement against the flange 58, thereby closing off air from the inlet port 56. At this time, the valve 54 also opens the first air bleed port 75 so as to allow the bleeding of the air pressure from the air chamber 8 of the emergency brake 20, thus causing the brake to be applied. It will be understood that the stem 53, when raised, will cause the valve 54 to remain in its closed position, unless the knob 50 is depressed manually.

In the event that a failure occurs in either of the hydraulic conduits 12A and 12B during the travel of the vehicle, an abnormal braking condition will be present when the operator depresses the foot brake pedal 4A to brake the vehicle with the service brakes. It will be appreciated that when this occurs, a pressure difference will be present between the lines 12A and 12B which will cause the moveable switch contact 32 of the switch 30 to shift either to the right or to the left, depending upon whether the failure occurs in line 12A or 12B. Thus, the moveable contact will be brought into contact with the fixed contacts 30A and 30B, as shown in FIG. 3. This closes the switch 30 which completes the circuit of the relay 15. The relay, in turn, effects the completion of the circuit to the solenoid valve 6, thereby energizing the electromagnetic core 66.

The electromagnetic core 66 attracts the head 69 of the stem 68, thereby effecting the upseating of the valve 70 to open the second air bleed port 71. Thus, pressurized air from the air chamber 8 will be discharged through the port 71. Also at this time, the air pressure within the integral valve body 51 will be lowered, thereby allowing the return spring 52 of the emergency valve 5 to bring the valve 54 into seating engagement against the flange 58. This opens the first air bleed port 75 which accelerates the bleeding of the air chamber 8, thus accelerating the application of the brake 20, thereby bringing the vehicle to a stop.

Once the vehicle is initially stopped, it is sometimes desirable to effect the release of the parking brake to enable the vehicle to be driven or towed away for repairs. This may be accomplished by the present invention by opening the manual switch 76 in lead 16, thereby disabling the electric circuit to the solenoid operated valve 6. Thus, the knob 50 of the emergency valve 5 may be depressed so as to redirect air pressure to the air releasing motor 8 of the emergency brake 20, thereby effecting the release of the brake to permit the movement of the vehicle.

As is readily apparent from the foregoing, the construction of the present emergency brake system fully satisfies the objects of the present invention by automatically applying the emergency brake in the event of a failure in the hydraulic portion of the service brake system when the operator actuates the control valve 4 of the service brake system to effect the application of the service brakes.

Also, it will be appreciated that the implementation of the present control system does not effect the normal functioning of either the standard service brake system or the emergency brake system of the vehicle.

It will be readily appreciated that the emergency brake system according to the present invention is effective in insuring the safety of the vehicle.

While the invention has been described and shown with particular reference to the preferred embodiment, it will be apparent that variations might be possible that would fall within the scope of the present invention, which is not intended to be limited except as defined in the following claims.

What is claimed is:

1. An emergency brake system for a vehicle of the type including separate fluid operated front and rear wheel service brakes and a control system having separate front and rear fluid conduits for individually conducting pressurized fluid to such brakes to effect their application, comprising:
   an emergency brake;
   pressure differential detecting means connected to each of the fluid conduits for detecting a difference in the fluid pressures of the conduits;
   means connected to said detecting means and to said emergency brake for automatically applying said emergency brake when the service brakes are applied and the difference in the pressures of the conduits is beyond a predetermined value;
   a source of pressurized air;
   an air releasing motor connected to said emergency brake and including spring means to effect application of said emergency brake, said motor being responsive to a predetermined air pressure to effect the release of the emergency brake; and
   said means for automatically applying said emergency brake includes a solenoid operated air bleed valve for normally communicating pressurized air from said source to said second air releasing motor, and electric circuit means operative in response to said pressure detecting means to open said solenoid operated air bleed valve so as to exhaust the air from said air releasing motor, thereby effecting the application of the emergency brake.

2. The emergency brake system of claim 1 including:
   a manual emergency valve for manual control of air pressure from said source of pressurized air to said emergency brake;
   an integral body for housing the manual emergency valve and the solenoid air bleed valve together in an integral manner, said body having an inlet port connected to said source of pressurized air, an outlet port connected to said air releasing motor of the emergency brake, first and second air bleed ports, and internal passage means interconnecting said inlet port with said outlet port and having a first portion thereof communicating with said first air bleed port and a second portion thereof communicating with said second air bleed port; and wherein
   said emergency valve includes a valve member in said first portion of the passage means and movable between a first position in which the valve member blocks the first air bleed port while permitting communication between the inlet and outlet ports and a second position in which the valve member blocks the inlet port while communicating the outlet port with the first air bleed port; and wherein said solenoid operated air bleed valve includes a valve member in the second portion of the passage means which is movable between a first position in which it blocks said second air bleed port and a second position for unblocking said second air bleed port, said valve member of the emergency valve being responsive to air pressure so as to be shifted to its second position when a pressure loss occurs so that when the valve member of the solenoid operated air bleed valve is in its second position for bleeding air from the air releasing motor, which results in a drop in air pressure in the passage means of the integral body, the valve member of the emergency valve will also be shifted to its second position, thereby permitting air to be exhausted from both air bleed ports so as to accelerate the application of the emergency brake.

3. The emergency brake system of claim 1 wherein said pressure differential detecting means includes:
a body having a pair of flow paths therethrough, each connected with a respective one of said pair of conduits, a transverse bore connected between said flow paths and switch means including a pair of fixed electrical contacts mounted within said body and serially connected to said electric circuit means, and a movably electrical contact reciprocably mounted within said bore and movable in response to said pressure difference in the flow paths into contacting relation with said fixed contacts when said pressure difference is beyond said predetermined value, thereby closing said switch means to effect the energization of said solenoid operated air bleed valve.

4. In a vehicle having an air-over-hydraulic service brake system including a source of pressurized air for controlling the brake system, separate front and rear wheel service brakes, dual hydraulic master cylinders and a pair of fluid conduits, each connecting one of the master cylinders with a respective one of the front and rear wheel service brakes to effect their application, an improved emergency brake system having a spring applied, air pressure released emergency brake and a manual emergency valve for controlling air pressure from said source to the emergency brake, wherein the improvement comprises:
a solenoid operated air bleed valve connected between the manual emergency valve and the emergency brake for releasing air from the emergency brake when being electrically energized;
an electric circuit connected to said solenoid operated air bleed valve; and
pressure differential detecting means connected to each of the fluid conduits of the service brake system for detecting a difference in the fluid pressures of the conduits and to said electric circuit, said detecting means being operative in response to said pressure difference to close said circuit, thereby energizing said solenoid operated air bleed valve when the service brakes are applied and said difference is beyond a predetermined value so as to automatically effect the application of the emergency brake for braking the vehicle.

5. The emergency brake system of claim 4 including an integral body for housing the manual emergency valve and the solenoid operated air bleed valve together in an integral manner, said body having an inlet port connected to said source of pressurized air, an outlet port connected to the emergency brake, first and second air bleed ports and internal passage means interconnecting said inlet and outlet ports and having a first portion thereof communicating with said first air bleed port and a second portion thereof communicating with said second air bleed port; and wherein said emergency valve includes a valve member in said first portion of the passage means to block said first air bleed port while permitting communication through said passage means in a first position and to block communication to the inlet port while communicating the outlet port with the first air bleed port in a second position, and the air bleed valve includes a valve member in said second portion of the passage means to block said second air bleed port in one position and to open said second air bleed port in a second position to communicate air from the outlet port and the passage means therewith, said valve member of the emergency valve being responsive to air pressure so as to be shifted to its second position when a pressure loss occurs so that when the valve member of the solenoid operated air bleed valve is shifted to its second position to bleed air from the emergency brake, the valve member of the emergency valve is also shifted to its second position, thereby permitting air to be exhausted through both air bleed ports so as to accelerate the application of the emergency brake.

6. The emergency brake system of claim 5 wherein said pressure differential detecting means includes:
a body having a pair of flow paths therethrough, each connected with a respective one of said pair of conduits, a transverse bore connected between said flow paths and switch means including a pair of fixed electrical contacts mounted within said body and serially connected to said electric circuit and a movably electrical contact reciprocably mounted within said bore and movable in response to said pressure difference in the flow paths into contacting relation with said fixed contacts when said pressure difference is beyond said predetermined value, thereby closing said switch means to effect the energization of said solenoid operated air bleed valve.

* * * * *